(12) United States Patent
Hu et al.

(10) Patent No.: US 12,010,710 B2
(45) Date of Patent: Jun. 11, 2024

(54) COMMUNICATION PROCESSING METHOD FOR UPLINK RESOURCE REQUEST AND RELATED DEVICE

(71) Applicant: Huawei Technologies Co., Ltd., Shenzhen (CN)

(72) Inventors: Yuanzhou Hu, Shanghai (CN); Mengying Ding, Shanghai (CN); Shuri Liao, Shanghai (CN); Fan Wang, Berkshire (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 534 days.

(21) Appl. No.: 17/244,545

(22) Filed: Apr. 29, 2021

(65) Prior Publication Data

US 2021/0250952 A1 Aug. 12, 2021

Related U.S. Application Data

(63) Continuation of application No. PCT/CN2019/111411, filed on Oct. 16, 2019.

(30) Foreign Application Priority Data

Oct. 31, 2018 (CN) .......................... 201811290032.4

(51) Int. Cl.
*H04W 72/53* (2023.01)
*H04J 13/00* (2011.01)
(Continued)

(52) U.S. Cl.
CPC ......... *H04W 72/53* (2023.01); *H04J 13/0003* (2013.01); *H04L 27/2607* (2013.01); *H04W 72/0466* (2013.01); *H04W 72/21* (2023.01)

(58) Field of Classification Search
None
See application file for complete search history.

(56) References Cited

U.S. PATENT DOCUMENTS

| 7,778,151 B2 | 8/2010 | Bertrand et al. |
| 2008/0080472 A1 | 4/2008 | Bertrand et al. |
| (Continued) |

FOREIGN PATENT DOCUMENTS

| CN | 101247166 A | 8/2008 |
| CN | 103069763 A | 4/2013 |
| (Continued) |

OTHER PUBLICATIONS

"Short PUCCH formats for 1~2 UCI bits," 3GPP TSG RAN WG1 Meeting #89, Hangzhou, China, R1-1707387, pp. 1-3, 3rd Generation Partnership Project, Valbonne, France (May 15-19, 2017).

(Continued)

*Primary Examiner* — Alpus Hsu
*Assistant Examiner* — Camquyen Thai
(74) *Attorney, Agent, or Firm* — Leydig, Voit & Mayer, Ltd.

(57) ABSTRACT

Embodiments of this application provide a communication processing method for a resource request and a related device. In the communication processing method, a terminal side device sends K uplink resource requests on K (K is an integer greater than or equal to 2) uplink channel resources in a transmission time unit (for example, 1 millisecond) to request an uplink resource used for uplink transmission, where cyclic shifts of a code division multiplexing (CDM) sequence used to send the K uplink resource requests on the K uplink channel resources are specific to the terminal side device, or a value of K is specific to the terminal side device, or a combination of the cyclic shifts and K is specific to the terminal side device.

15 Claims, 4 Drawing Sheets

(51) Int. Cl.
  *H04L 27/26* (2006.01)
  *H04W 72/044* (2023.01)
  *H04W 72/21* (2023.01)

(56) References Cited

U.S. PATENT DOCUMENTS

| | | | | |
|---|---|---|---|---|
| 2008/0186931 | A1* | 8/2008 | Prakash | H04W 28/24 |
| | | | | 370/346 |
| 2009/0290570 | A1* | 11/2009 | Kishiyama | H04W 74/04 |
| | | | | 370/344 |
| 2010/0118828 | A1* | 5/2010 | Kwon | H04L 5/0091 |
| | | | | 370/330 |
| 2010/0202392 | A1* | 8/2010 | Zhang | H04W 52/48 |
| | | | | 370/329 |
| 2012/0236816 | A1* | 9/2012 | Park | H04W 74/08 |
| | | | | 370/329 |
| 2014/0050185 | A1 | 2/2014 | Hooli et al. | |
| 2014/0328306 | A1* | 11/2014 | Gao | H04W 16/14 |
| | | | | 370/329 |
| 2016/0227560 | A1* | 8/2016 | Webb | H04W 72/569 |
| 2018/0302198 | A1* | 10/2018 | Wang | H04L 1/1861 |
| 2020/0236670 | A1* | 7/2020 | Xiong | H04L 1/1812 |

FOREIGN PATENT DOCUMENTS

| | | |
|---|---|---|
| CN | 103220680 A | 7/2013 |
| CN | 108111280 A | 6/2018 |
| CN | 108633082 A | 10/2018 |
| EP | 3386251 A1 | 10/2018 |
| JP | 2020535704 A | 12/2020 |
| WO | 2016048597 A1 | 3/2016 |
| WO | 2018013596 A1 | 1/2018 |
| WO | 2018112322 A2 | 6/2018 |
| WO | 2018175801 A1 | 9/2018 |
| WO | 2019060831 A1 | 3/2019 |

OTHER PUBLICATIONS

"Sharing PUCCH-SR," 3GPP TSG RAN WG2 Meeting #68bis, Valencia, SP, R2-100207, pp. 1-4, 3rd Generation Partnership Project, Valbonne, France (Jan. 18-22, 2010).

Huawei, HiSilicon, "Short PUCCH over 2 OFDM symbols," 3GPP TSG RAN WG1 Meeting #91, Reno, USA, R1-1719393, XP051369302, total 3 pages, 3rd Generation Partnership Project, Valbonne, France (Nov. 27-Dec. 1, 2017).

LG Electronics, "Text proposals for short PUCCH structure," 3GPP TSG RAN WG1 Meeting AH 1801, Vancouver, Canada, R1-1800375, XP051384830, total 8 pages, 3rd Generation Partnership Project, Valbonne, France (Jan. 22-26, 2018).

"Short PUCCH for UCI up to 2 bits [online]," 3GPP TSG RAN WG1 Meeting 90bis, Prague, CZ, R1-1717382, Total 8 pages, 3rd Generation Partnership Project, Valbonne, France (Oct. 9-13, 2017).

\* cited by examiner

COMMUNICATION PROCESSING METHOD FOR UPLINK RESOURCE REQUEST AND RELATED DEVICE

CROSS-REFERENCE TO RELATED APPLICATIONS

This application is a continuation of International Application No. PCT/CN2019/111411, filed on Oct. 16, 2019, which claims priority to Chinese Patent Application No. 201811290032.4, filed on Oct. 31, 2018. The disclosures of the aforementioned applications are hereby incorporated by reference in their entireties.

TECHNICAL FIELD

Embodiments of this application relate to the field of wireless communications, and in particular, to a communication processing technology for an uplink resource request.

BACKGROUND

A wireless communications system includes a terminal side device and an access network side device that serves the terminal side device. The terminal side device and the access network side device are both divided based on protocol layers, and separately include higher layers and a physical (PHY) layer. The higher layers include a media access control (MAC) layer, a radio link control (RLC) layer, a packet data convergence protocol (PDCP) layer, a radio resource control (RRC) layer, and the like.

When the terminal side device has uplink data to be sent to the access network side device, the terminal side device may send an uplink resource request, for example, a scheduling request (SR), to the network side on an uplink channel resource configured by the access network side device, to further obtain an uplink resource used to send the uplink data.

To enable the access network side device to support an excessively large quantity of connections (for example, hundreds of thousands of connections or millions of connections) to terminal side devices, at least two terminal side devices may share a same uplink channel resource to send the uplink resource request. However, in this manner, it is difficult for the access network side device to identify which terminal side device sends the uplink resource request.

SUMMARY

Embodiments of this application provide a communication processing method for an uplink resource request, to improve accuracy of identifying a terminal side device that sends an uplink resource request.

A first aspect of the embodiments of this application provides a communication processing method for an uplink resource request, and the method is performed by a terminal side device. The terminal side device may be independent user equipment, or may be at least one chip in the user equipment or a circuit system that is in the user equipment and that implements the communication processing method.

In the communication processing method for an uplink resource request that is provided in the first aspect, the terminal side device sends K uplink resource requests on K (K is an integer greater than or equal to 2) uplink channel resources in a transmission time unit (for example, duration of 1 ms), and receives resource allocation information that is used to indicate an uplink resource and that is sent by an access network side device, where cyclic shifts of a code division multiplexing (CDM) sequence used to send the K uplink resource requests on the K uplink channel resources are specific to the terminal side device, or K is specific to the terminal side device, or a combination of the cyclic shifts and K is specific to the terminal side device.

According to the technical solution provided in the first aspect, when the terminal side device sends the K uplink resource requests in the same transmission time unit, the cyclic shifts specific to the terminal side device are used, or a quantity K of sending times that is specific to the terminal side device is used, or the combination that is of the cyclic shifts and K and that is specific to the terminal side device is used, so that the access network side device can determine, based on information specific to the terminal side device, whether the received uplink resource requests are sent by the terminal side device. Therefore, accuracy of identifying the terminal side device by the access network side device is improved.

Based on the first aspect, in a first possible implementation of the first aspect, the method further includes: The terminal side device receives higher layer signaling sent by the access network side device, where the higher layer signaling indicates the cyclic shifts of the CDM sequence used for the K uplink resource requests.

According to the technical solution further provided in the first possible implementation of the first aspect, the cyclic shifts of the CDM sequence may be determined by the access network side device and then directly configured for the terminal side device by using the higher layer signaling. Optionally, the higher layer signaling is MAC layer signaling, RLC layer signaling, PDCP layer signaling, or RRC layer signaling.

Based on the first aspect, in a second possible implementation of the first aspect, the method further includes: The terminal side device receives higher layer signaling sent by the access network side device, where the higher layer signaling indicates a parameter that is used to determine the cyclic shifts and that is specific to the terminal side device.

In the second possible implementation of the first aspect, the access network side device notifies the terminal side device of the related parameter used to determine the cyclic shifts, so that the terminal side device determines the cyclic shifts.

Based on the second possible implementation of the first aspect, in a third possible implementation of the first aspect, a $k^{th}$ cyclic shift of the CDM sequence is a cyclic shift $\alpha_k$ used for a $k^{th}$ uplink resource request in the K uplink resource requests, where $\alpha_k$ is determined by a parameter $I_k$ and $I_k$ satisfies the following relationship:

$$I_{idx} = I_0 \cdot (N_{cs})^0 + I_1 \cdot (N_{cs})^1 + \ldots + I_k \cdot (N_{cs})^m + \ldots + I_{K-1} \cdot (N_{cs})^{K-1},$$

where $N_{cs}$ is a maximum quantity of possible values of the cyclic shift of the CDM sequence, the parameter $I_{idx}$ is the parameter indicated in the higher layer signaling, and k is any integer from 0 to K−1.

The technical solution provided in the third possible implementation of the first aspect provides a manner of calculating the cyclic shift $\alpha_k$. When k traverses from the number 0 to the number K−1, cyclic shifts $\{\alpha_0, \alpha_1, \ldots, \alpha_{K-1}\}$ for all the K uplink resource requests may be calculated.

Based on the second possible implementation or the third possible implementation of the first aspect, in a fourth possible implementation of the first aspect, a quantity of bits occupied by the higher layer signaling is $\log_2\lceil (N_{cs})^{K_{max}}$, where $K_{max}$ is a maximum value of K, and $N_{CS}$ is the maximum quantity of possible values of the cyclic shift of the CDM sequence.

In the technical solution provided in the fourth possible implementation of the first aspect, based on the maximum quantity of possible values of the cyclic shift used on a terminal side, the quantity of bits occupied by the higher layer signaling that is used to indicate the cyclic shift is further designed, so that the higher layer signaling can indicate all the possible values, to avoid a waste that is caused because excessively many bits are used.

Based on the first aspect, in a fifth possible implementation of the first aspect, the cyclic shifts of the CDM sequence may alternatively be determined based on an identifier of the terminal side device.

The fifth possible implementation of the first aspect provides a manner of calculating the cyclic shifts. Generally, the identifier of the terminal side device is different from an identifier of another terminal side device. Therefore, the cyclic shifts of the CDM sequence that are calculated based on the identifier of the terminal side device are also specific to the terminal side device.

A second aspect of the embodiments of this application provides a terminal side device, and the terminal side device includes a receiving unit and a sending unit. The receiving unit is configured to perform a receiving action in any one of the first aspect and the possible implementations of the first aspect, and the sending unit is configured to perform an action such as sending in any one of the first aspect and the possible implementations of the first aspect. In a specific physical implementation, the receiving unit may be a receiving circuit or a receiver, and the sending unit may be a sending circuit or a transmitter. Optionally, the terminal side device may be an independent terminal device, or may be a chip or a circuit system in the terminal device. The chip or the circuit system includes a plurality of gate circuits to implement functions of the foregoing functional units. The terminal side device provided in the second aspect can implement the beneficial effects achieved in any one of the first aspect and the possible implementations of the first aspect. Details are not described again.

A third aspect of the embodiments of this application provides a communication processing method for an uplink resource request, and the method is performed by an access network side device. The access network side device may be an independent access network device, or may be at least one chip in the access network device or a circuit system that is in the access network device and that implements the communication processing method.

In the communication processing method for an uplink resource request that is provided in the third aspect, the access network side device receives K uplink resource requests on K (K is an integer greater than or equal to 2) uplink channel resources in a transmission time unit (for example, duration of 1 ms); the access network side device identifies, based on K, cyclic shifts of a CDM sequence for the K uplink resource requests, or a combination of the cyclic shifts and K, a terminal side device that sends the K uplink resource requests, where the cyclic shifts are specific to the terminal side device, K is specific to the terminal side device, or the cyclic shifts and K are specific to the terminal side device; and after identifying the terminal side device, the access network side device sends resource allocation information to the terminal side device, where the resource allocation information indicates an uplink resource.

According to the technical solution provided in the third aspect, in a process in which the access network side device receives the K uplink resource requests on the K uplink channel resources in the same transmission time unit, the access network side device may identify, based on K, the cyclic shifts of the CDM sequence for the K uplink resource requests, or the combination of the cyclic shifts and K, the terminal side device that sends the uplink resource requests, thereby improving accuracy of identifying the terminal side device by the access network side device.

Based on the third aspect, in a first possible implementation of the third aspect, the method further includes: The access network side device sends higher layer signaling to the terminal side device, where the higher layer signaling indicates the cyclic shifts.

According to the technical solution further provided in the first possible implementation of the third aspect, the cyclic shifts of the CDM sequence may be determined by the access network side device and then directly configured for the terminal side device by using the higher layer signaling. Optionally, the higher layer signaling is MAC layer signaling, RLC layer signaling, PDCP layer signaling, or RRC layer signaling.

Based on the third aspect, in a second possible implementation of the third aspect, the access network side device further sends higher layer signaling to the terminal side device, where the higher layer signaling indicates a parameter that is used to determine the cyclic shifts and that is specific to the terminal side device.

In the second possible implementation of the third aspect, the access network side device notifies the terminal side device of the related parameter used to determine the cyclic shifts, so that the terminal side device determines the cyclic shifts.

Based on the third aspect, in a third possible implementation of the third aspect, a $k^{th}$ cyclic shift of the CDM sequence is a cyclic shift $\alpha_k$ used for a $k^{th}$ uplink resource request in the K uplink resource requests, where $\alpha_k$ is determined based on a parameter $I_k$ and $I_k$ satisfies the following relationship:

$$I_{idx}=I_0 \cdot (N_{cs})^0 + I_1 \cdot (N_{cs})^1 + \ldots + I_k \cdot (N_{cs})^m + \ldots + I_{K-1} \cdot (N_{cs})^{K-1},$$

where $N_{cs}$ is a maximum quantity of possible values of the cyclic shift of the CDM sequence, the parameter $I_{idx}$ is the parameter indicated in the higher layer signaling, and k is any integer from 0 to K−1.

The technical solution provided in the third possible implementation of the third aspect provides a manner of calculating the cyclic shift $\alpha_k$. When k traverses from the number 0 to the number K−1, cyclic shifts $\{\alpha_0, \alpha_1, \ldots, \alpha_{K-1}\}$ for all the K uplink resource requests may be calculated.

Based on the second possible implementation or the third possible implementation of the third aspect, in a fourth possible implementation of the third aspect, a quantity of bits occupied by the higher layer signaling is $\log_2[(N_{cs})^{K_{max}}]$, where $K_{max}$ is a maximum value of K, and $N_{CS}$ is the maximum quantity of possible values of the cyclic shift of the CDM sequence.

In the technical solution provided in the fourth possible implementation of the third aspect, based on the maximum quantity of possible values of the cyclic shift used on a terminal side, the quantity of bits occupied by the higher layer signaling that is used to indicate the cyclic shift is further designed, so that the higher layer signaling can indicate all the possible values, to avoid a waste that is caused because excessively many bits are used.

Based on the third aspect, in a fifth possible implementation of the third aspect, the cyclic shifts of the CDM sequence may alternatively be determined based on an identifier of the terminal side device.

The fourth possible implementation of the first aspect provides a manner of calculating the cyclic shifts. Generally, the identifier of the terminal side device is different from an identifier of another terminal side device. Therefore, the cyclic shifts of the CDM sequence that are calculated based on the identifier of the terminal side device are also specific to the terminal side device.

A fourth aspect of the embodiments of this application provides an access network side device, where the access network side device includes a receiving unit, a processing unit, and a sending unit. The receiving unit is configured to perform a receiving action in any one of the third aspect and the possible implementations of the third aspect, the sending unit is configured to perform a sending action in any one of the third aspect and the possible implementations of the third aspect, and the processing unit is configured to perform processing actions such as identification and determining in any one of the third aspect and the possible implementations of the third aspect. In a specific physical implementation, the receiving unit may be a receiving circuit or a receiver, the sending unit may be a sending circuit or a transmitter, and the processing unit may be a processing circuit or a processor. Optionally, the access network side device may be an independent access network device (for example, a base station), or may be a chip or a circuit system in the access network device. The chip or the circuit system includes a plurality of gate circuits to implement functions of the foregoing functional units. The access network side device provided in the fourth aspect can implement the beneficial effects achieved in any one of the third aspect and the possible implementations of the third aspect. Details are not described again.

A fifth aspect of the embodiments of this application provides a communication processing device, including a processor and a memory, where the memory stores instruction code, and when the code is invoked by the processor, the method according to any one of the first aspect and the possible implementations of the first aspect is implemented, or the method according to any one of the third aspect and the possible implementations of the third aspect is implemented. Optionally, the communication processing device provided in the fifth aspect may be a chip system. The communication processing device provided in the fifth aspect can implement the beneficial effects achieved in any one of the first aspect and the possible implementations of the first aspect, or can implement the beneficial effects achieved in any one of the third aspect and the possible implementations of the third aspect. Details are not described again.

A sixth aspect of this application provides a computer storage medium. The computer storage medium stores code, and when executed by a computer, the code is used to implement the method according to any one of the first aspect and the possible implementations of the first aspect, or implement the method according to any one of the third aspect and the possible implementations of the third aspect. The computer storage medium provided in the sixth aspect may be included in a chip system, or may include the chip system. The computer storage medium provided in the sixth aspect may implement the beneficial effects achieved in any one of the first aspect and the possible implementations of the first aspect, or may implement the beneficial effects achieved in any one of the third aspect and the possible implementations of the third aspect. Details are not described again.

DESCRIPTION OF EMBODIMENTS

Figure 1:
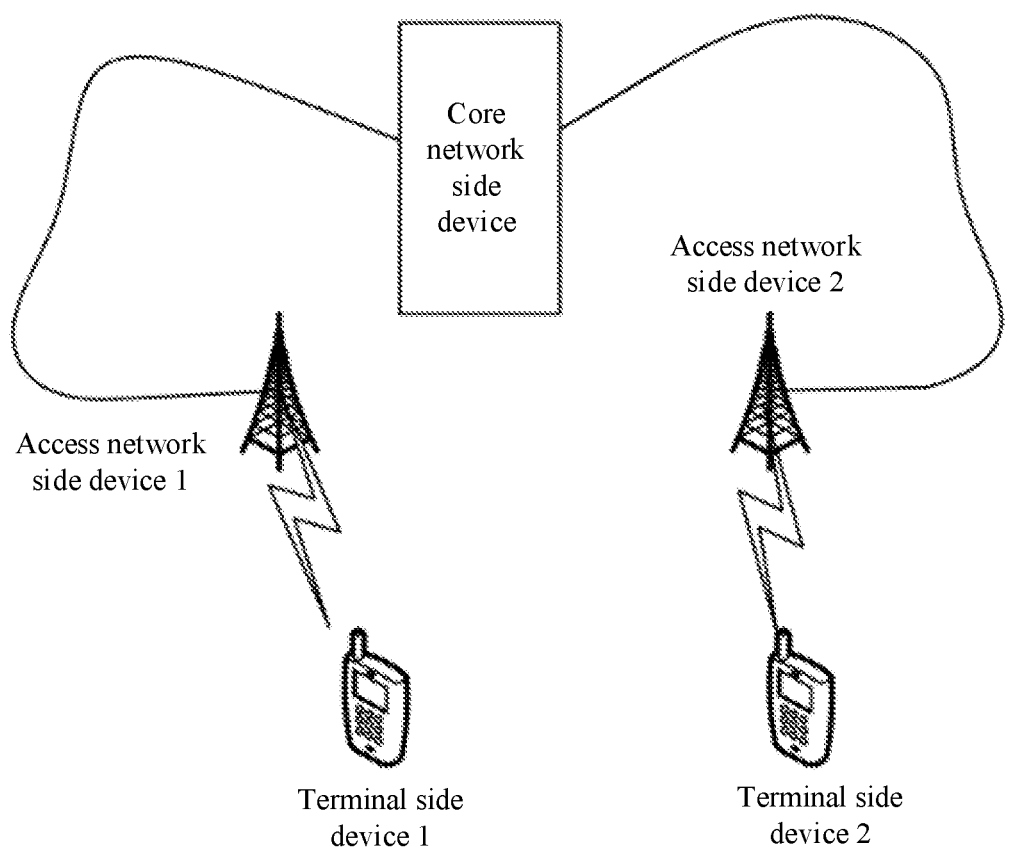
FIG. 1 is a schematic architectural diagram of a wireless communications system according to an embodiment of this application.

A wireless communications system shown in FIG. 1 includes an access network side device and a terminal side device, and optionally, further includes a core network side device. The access network side device may be various transmission reception points (TRP) such as a base station or a wireless local area network access point, to provide an access service on a licensed spectrum or an access service on an unlicensed spectrum for the terminal side device. The access network side device is connected to the core network side device in a wired or wireless manner. The terminal side device includes user equipment (UE), and is a device that provides a user with voice and/or data connectivity, for example, a handheld device or a vehicle-mounted device with a wireless connection function. Common terminal side devices include, for example, a mobile phone, a tablet computer, a notebook computer, a palmtop computer, a mobile internet device (MID), and a wearable device such as a smartwatch, a smart band, and a pedometer.

The terminal side device and the access network side device respectively transmit uplink data and downlink data over an air interface on an uplink and a downlink based on protocol layers. The access network side device may be used as an independent device, or may be split into different devices based on the protocol layers. For example, after the access network side device is split based on the protocol layers, the access network side device may include one control unit (CU) and at least one distributed unit (DU). The CU is configured to implement functions of the access network side device at a PDCP layer, an RRC layer, and a protocol layer above the RRC layer; and the DU is configured to implement functions of the access network side device at an RLC layer, a MAC layer, and a PHY layer.

A person skilled in the art may understand that, in the following implementations, the function of the access network side device at the PDCP layer, the RRC layer or the protocol layer above the RRC layer may be performed by the CU; and the function of the access network side device at the RLC layer, the MAC layer, or the PHY layer is performed by the at least one DU.

The wireless communications system shown in FIG. 1 may be a wireless communications system such as a new radio (NR) system (also referred to as a 5G system), a long term evolution (LTE) system, a long term evolution-advanced (LTE-A) system, or an evolved long term evolution (eLTE) system.

In the embodiments of this application, from a perspective of physical implementation, the access network side device may be a base station, a wireless local area network access point, or a chip or a circuit system in the base station or the wireless local area network access point; and the terminal side device may be user equipment, or a chip or a circuit system in the user equipment.

In the embodiments of this application, an uplink resource is mainly used by the terminal side device to send uplink data. The uplink resource is an uplink resource allocated by the access network side device in response to an uplink resource request sent by the terminal side device on an uplink channel resource. The uplink data may be uplink control signaling or an uplink service. Optionally, the uplink resource request may be a scheduling request (SR) or a random access preamble.

In the embodiments of this application, the uplink channel resource is a channel resource mainly used to send the uplink resource request.

Optionally, the uplink channel resource is indicated by the access network side device to the terminal side device by using signaling. Specifically, the uplink channel resource may be determined based on one or any combination of the following: a time domain resource of the uplink channel resource, a frequency domain resource of the uplink channel resource, and a code domain resource of the uplink channel resource. The signaling herein may be RRC signaling, a MAC message, a broadcast message, or physical layer signaling.

The broadcast message may include a remaining minimum system information (RMSI) or a system message block (SIB). The physical layer signaling herein may be signaling carried on a physical downlink control channel or signaling carried on a physical downlink shared channel (PDSCH). The physical downlink control channel may be a physical downlink control channel (PDCCH), an enhanced physical downlink control channel (EPDCCH), a narrowband physical downlink control channel (NPDCCH), a machine type communication physical downlink control channel (MPDCCH), or the like in the LTE system or the NR system.

The time domain resource of the uplink channel resource is determined based on a start time domain position in which an uplink channel is located and time domain duration of the uplink channel, or is determined based on an end time domain position in which an uplink channel is located and time domain duration of the uplink channel.

The frequency domain resource of the uplink channel resource is determined based on a start resource block (RB) in which the uplink channel is located and a frequency domain bandwidth size of the uplink channel, or is determined based on an end resource block of the uplink channel and a frequency domain bandwidth size of the uplink channel. One RB is a frequency domain bandwidth including $N_{sc}^{RB}$ consecutive subcarriers, and $N_{sc}^{RB}$ may be 12.

The code domain resource of the uplink channel resource is determined based on at least one of the following: a code division multiplexing (CDM) sequence used on the uplink channel resource, a cyclic shift (a time domain cyclic shift or a frequency domain cyclic shift) of the CDM sequence, and an orthogonal code sequence used on the uplink channel resource. The CDM sequence may be a constant amplitude zero auto-correlation (CAZAC) sequence, and same base sequences that are of the CAZAC sequence and on which different cyclic shifts (CS) are performed (where lengths of the cyclic shifts do not exceed a length of the base sequence) are orthogonal to each other. The CAZAC sequence mainly includes a Zadoff-Chu (ZC) sequence, a Frank sequence, a Chirp sequence, and the like. The orthogonal code sequence mainly includes a Walsh code, a Hadamard code, a Walsh-Hadamard code, and the like.

In the embodiments of this application, the uplink channel may be a random access channel or an uplink control channel (for example, a physical uplink control channel). Correspondingly, the uplink channel resource may be a resource of the random access channel and a resource of the uplink control channel. An uplink resource request sent on the random access channel is a random access preamble in a random access process, and an uplink resource request sent on the uplink control channel is a scheduling request (SR).

When the terminal side device has the resource that is of the uplink control channel and that is for sending the SR and is in uplink synchronization with the access network side device, the terminal side device may send the SR to the access network side device on the resource of the uplink control channel, to request the uplink resource. In other cases, the terminal side device may send the random access preamble on the resource of the random access channel, to request the uplink resource.

With development of wireless communications technologies, the access network side device needs to support an excessively large quantity of connections (for example, hundreds of thousands of connections or millions of connections) to terminal side devices. These terminal side devices may be a machine type communication (MTC) device, a machine to machine (M2M) device, and a narrowband internet of things (NBIoT) device.

To support the excessively large quantity of connections, on one hand, the access network side device may allocate a plurality of shared uplink channel resources to different terminal side devices, and these different terminal side devices may randomly select one uplink channel resource from the plurality of shared uplink channel resources; on the other hand, the access network side device may specify a same uplink channel resource for different terminal side devices. However, in both the two implementations, the different terminal side devices may use a same uplink channel resource, and it is difficult for the access network side device to identify a terminal side device that sends an uplink resource request on the uplink channel resource.

Figure 2:
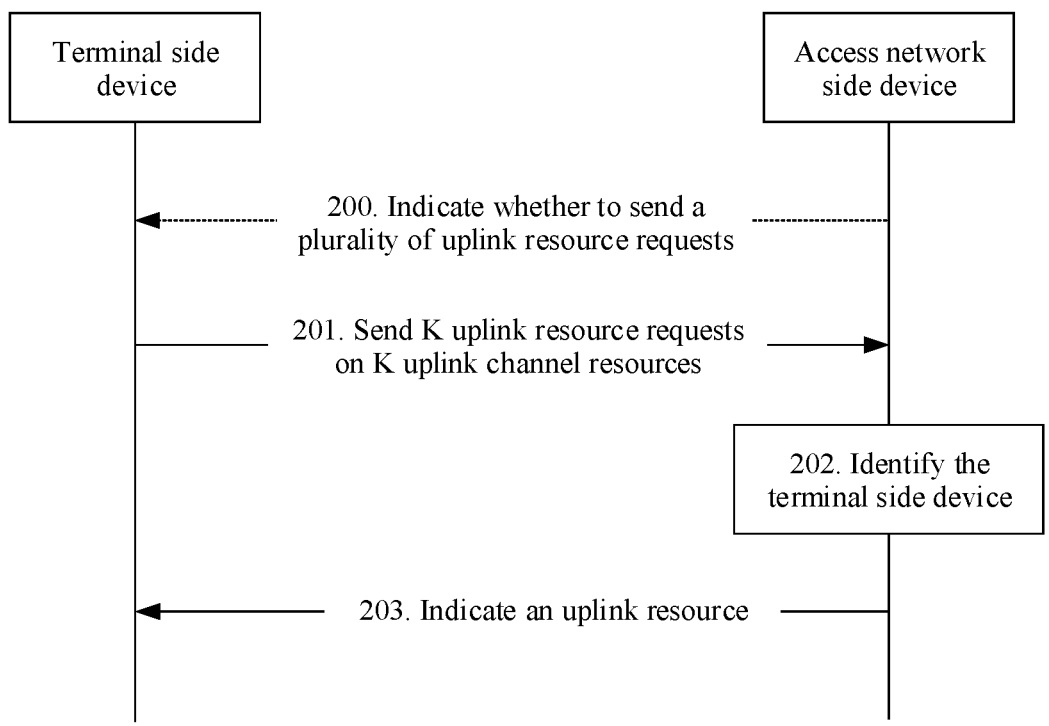
FIG. 2 is a schematic system interaction diagram of a communication processing method for an uplink resource request according to an embodiment of this application.

In view of the foregoing technical problem, a first embodiment of this application provides a communication processing method for an uplink resource request. As shown in the schematic system interaction diagram in FIG. 2, the following content is included.

201: A terminal side device sends K uplink resource requests on K uplink channel resources in a transmission time unit, where the K uplink resource requests do not overlap in time domain, and K is a positive integer greater than or equal to 2. Correspondingly, an access network side device receives the K uplink resource requests on the K uplink channel resources in the transmission time unit.

It may be understood that one transmission time unit is a period of time defined in time domain, for example, may be a periodicity in which the access network side device schedules data transmission for the terminal side device.

In an LTE system, when a subcarrier spacing is 15 kilohertz (kHz), one transmission time unit is one subframe of 1 millisecond (ms), and includes two slots of 0.5 ms, and each slot includes six or seven time domain symbols. In the LTE system, an orthogonal frequency division multiplexing (OFDM) technology is used on a downlink. Therefore, these time domain symbols are referred to as OFDM symbols on the downlink. In the LTE system, a single-carrier frequency division multiple access (SC-FDMA) technology is used on an uplink, and these time domain symbols are referred to as SC-FDMA symbols or SC-FDMA code elements on the uplink. Essentially, the SC-FDMA technology means performing discrete Fourier transform (DFT) spread (S) before inverse fast Fourier transform (IFFT) of OFDM. Therefore, the SC-FDMA technology may also be referred to as DFT-S-OFDM for short.

In an NR system, one transmission time unit includes 12 time domain symbols (in a case of an extended cyclic prefix) or 14 time domain symbols (in a case of a normal cyclic prefix). When a subcarrier spacing is 15 kHz, one transmission time unit is one slot of 1 ms; when the subcarrier spacing is 30 kHz, one transmission time unit is one slot of 0.5 ms; when the subcarrier spacing is 60 kHz, one transmission time unit is one slot of 0.25 ms; when the subcarrier spacing is 120 kHz, one transmission time unit is one slot of 0.125 ms; and when the subcarrier spacing is 240 kHz, one transmission time unit is one slot of 0.0625 ms. In the NR system, an OFDM technology is used on a downlink, and a discrete Fourier transform spread orthogonal frequency division multiplexing (DFT-S-OFDM) technology or an OFDM technology is used on an uplink.

In 201, one uplink resource request is sent on each of the K uplink channel resources, and a total of K uplink resource requests are sent on the K uplink channel resources. In the LTE system or the NR system, a maximum value of K is less than or equal to a total quantity (for example, 12 or 14) of time domain symbols included in the transmission time unit. The maximum value of K may be predefined, or may be notified by the access network side device to the terminal side device by using higher layer signaling. When the maximum value of K is equal to the total quantity of symbols included in the transmission time unit, one uplink channel resource occupies one time domain symbol, and a quantity of connections to a terminal side that are supported in the transmission time unit is the largest.

202: The access network side device identifies the terminal side device that sends the K uplink resource requests.

Optionally, the access network side device identifies, based on K, cyclic shifts of a code division multiplexing CDM sequence for the K uplink resource requests, or a combination of the cyclic shifts and K, the terminal side device that sends the K uplink resource requests.

It should be noted that various information "specific to the terminal side device" in the embodiments of this application are information, for example, information uniquely corresponding to the terminal side device or different information corresponding to different terminal side devices, that can be used to distinguish the terminal side device from another terminal side device without considering an exception. The exception herein may be, for example, that all terminal side devices cannot have unique or different information due to an excessively large quantity of terminal side devices or consideration of another requirement.

203: The terminal side device receives resource allocation information sent by the access network side device, where the resource allocation information indicates an uplink resource.

Optionally, before 201, the method further includes:

200: The access network side device sends indication information to the terminal side device, where the indication information indicates whether the terminal side device is to send a plurality of (including two) uplink resource requests.

Optionally, the indication information may be RRC signaling or physical layer signaling (for example, a physical downlink control channel), and occupies one bit. For example, the one bit indicates, by using a bit status value 1, the terminal side device to send the plurality of uplink resource requests, and indicates, by using a bit status value 0, the terminal side device not to send the plurality of uplink resource requests. In this case, the terminal side device may send one uplink resource request or may not send any uplink resource request.

Optionally, the terminal side device may alternatively determine, based on a value of K, whether to send a plurality of uplink resource requests.

For example, when the value of K (for example, may be indicated by using the higher layer signaling) is greater than or equal to 2, the terminal side device is indicated to perform step 201, to send the plurality of uplink resource requests. When the value of K is equal to 1, the terminal side device sends one uplink resource request on one uplink channel resource in the transmission time unit.

Optionally, that the K uplink resource requests do not overlap in time domain may be specifically: the K uplink resource requests are sequentially arranged in the transmission time unit based on at least one time domain symbol occupied by each uplink resource request. In this case, a start time domain position of a $k^{th}$ (0, 1, 2, . . . , or K−1) uplink resource request is $P_s+kL$, where $P_s$ is a start time domain position of the zero$^{th}$ uplink resource request, L is a quantity of time domain symbols occupied by each uplink resource request, and L is a positive integer.

Optionally, frequency domain positions of the K uplink resource requests may be notified by the access network device by using higher layer signaling (for example, RRC signaling). When the K uplink resource requests have different frequency domain positions, frequency hopping in frequency domain may be implemented, to obtain a frequency diversity gain.

Optionally, the value of K is specific to the terminal side device. In other words, different values of K may be used to distinguish between different terminal side devices. When the terminal side device and another terminal side device send uplink resource requests to the access network side device in the same transmission time unit, the access network side device may determine, based on the quantity K of received uplink resource requests, a terminal side device that sends the uplink resource requests.

Optionally, the cyclic shifts of the CDM sequence used on the K uplink channel resources are specific to the terminal side device. In other words, different cyclic shifts on the K uplink channel resources may be used to distinguish between different terminal side devices. The cyclic shifts corresponding to the K uplink channel resources may be the same or may be different. Using K=3 as an example, cyclic shifts that are on the three uplink channel resources and that correspond to a terminal side device A are {a CS 1, a CS 1, a CS 1}, cyclic shifts that are on the three uplink channel resources and that correspond to a terminal side device B are {the CS 1, a CS 2, a CS 2}, and cyclic shifts that are on the three uplink channel resources and that correspond to a terminal side device C are {the CS 1, the CS 2, a CS 3}. Because different terminal devices correspond to different cyclic shifts on the three uplink channel resources have different cyclic shifts, these different terminal side devices may be distinguished from each other.

The cyclic shifts may be indicated by the access network side device by using higher layer signaling (for example, RRC signaling) or determined based on an identifier of the terminal side device. When the terminal side device and the another terminal side device send the uplink resource requests to the access network side device in the same transmission time unit, the access network side device may determine, by using the cyclic shifts specific to the terminal side device, the terminal side device that sends the uplink resource requests.

Optionally, a quantity of possible values of the cyclic shift of the CDM sequence used on the K uplink channel resources is $N_{cs}$, and $N_{cs}$ may be predefined, or may be notified by the access network side device to the terminal side device by using higher layer signaling. For example, $N_{cs}$, may be predefined as $N_{cs}=N_{sc}^{RB}$, and $N_{sc}^{RB}$ is a quantity (for example, 12) of subcarriers included in one resource block (RB). For example, the quantity of possible values of the cyclic shift is expressed as:

$$\alpha_{group} = \frac{2\pi}{N_{cs}}(n_{idx}(\bmod N_{cs}), n_{idx} = 0, 1, 2, \ldots, N_{cs} - 1.$$

Optionally, the combination of the cyclic shifts and K is specific to the terminal side device. In other words, different combinations of the cyclic shifts and the value of K are used to distinguish between different terminal side devices.

Figure 3:
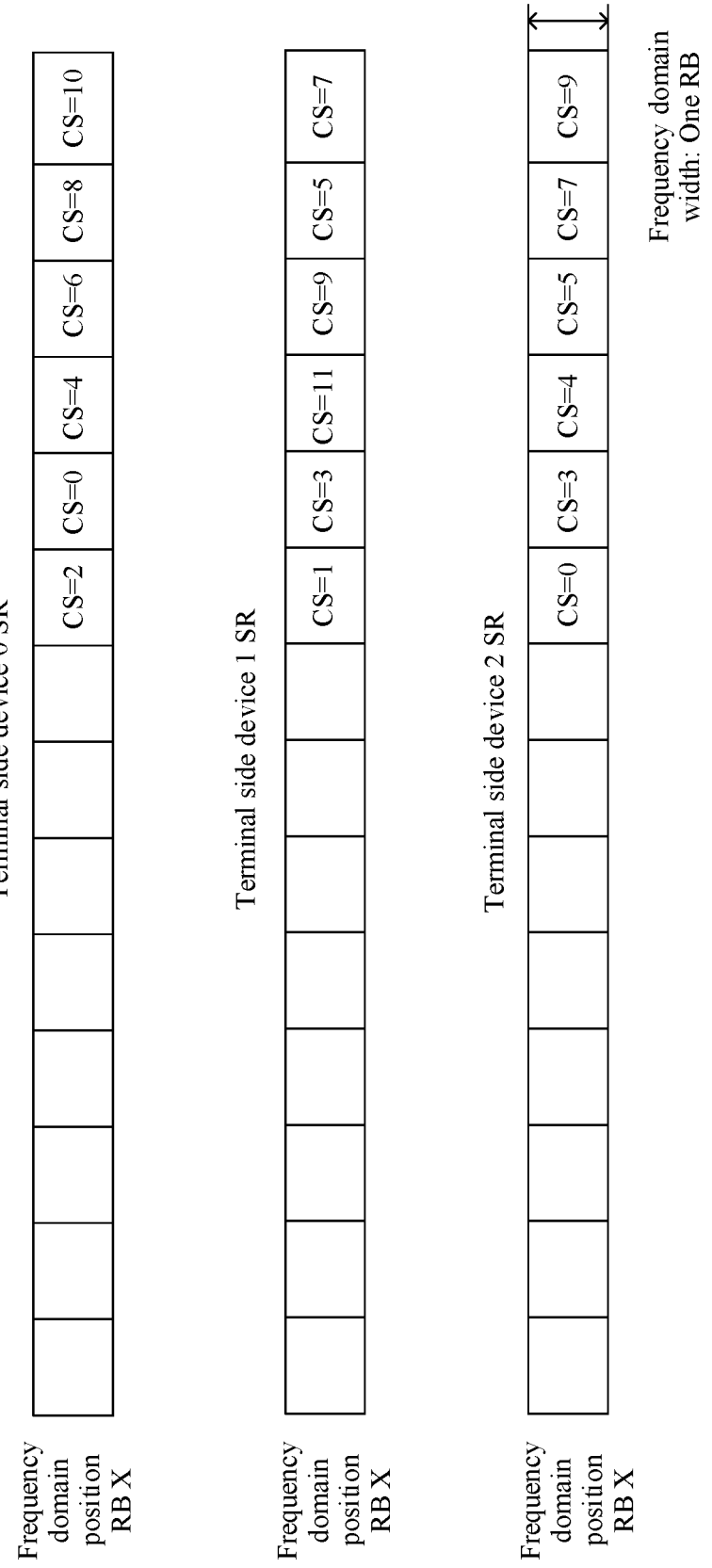
FIG. 3 is a schematic diagram of sending SRs by different terminal side devices in an NR system according to an embodiment of this application.

An example in which the uplink channel resource is in a physical uplink control channel format 0 in the NR system is used. As shown in FIG. 3, a terminal side device 0, a terminal side device 1, and a terminal side device 2 each send a plurality of SRs on a same $X^{th}$RB and in a same slot. It is assumed that a quantity K of SRs sent by each of the three terminal side devices is 6, a length L of at least one time domain symbol occupied by each SR is equal to one time domain symbol, a start time domain position $P_s$ of an uplink control channel resource used by the terminal side device 0 to send the zero$^{th}$ SR is the eighth time domain symbol, and the SRs are separately sent on six consecutive time domain symbols starting from the eighth time domain symbol. It is assumed that $N_{cs}=12$, and $n_{idx}$ corresponding to cyclic shifts of the CDM sequence used on the six time domain symbols are respectively: {the terminal side device 0: 2, 0, 4, 6, 8}, {the terminal side device 1: 1, 3, 11, 9, 5, 7}, and {the terminal side device 2: 0, 3, 4, 5, 7, 9}. Because different terminal side devices correspond to different cyclic shifts, the access network side device determines, based on the different cyclic shifts, which terminal side device sends a received SR.

It should be noted that in the embodiments of this application, the uplink resource request may not be sent together with hybrid automatic repeat request-acknowledgment/negative acknowledgment (HARQ-ACK/NACK) information on the K uplink control channel resources. Therefore, when an uplink channel is in the physical uplink control channel format 0, $m_{cs}=0$.

According to the technical solution provided in this embodiment of this application, the access network side device can accurately identify, based on the value that is of K and that is specific to the terminal side device, the cyclic shifts that are for the K uplink resource requests and that are specific to the terminal side device, or the combination of the value of K and the cyclic shifts, the terminal side device that sends the received uplink resource requests. In addition, for the solution in which the cyclic shifts specific to the terminal side device are used, because a maximum value of the cyclic shift may be a length of the CDM sequence, the access network side device can support simultaneous access of at least a quantity of terminal side devices, where the quantity is the $k^{th}$ power of the length of the CDM sequence. In this way, the quantity of connections to terminal side devices is further increased.

A second embodiment of this application provides a cyclic shift determining method. The method provided in the second embodiment is a further refinement and extension of how to determine the cyclic shift in the first embodiment. In the second embodiment, the access network side device determines the cyclic shift, and then directly notifies the terminal side device of the cyclic shift (which may be a value of the cyclic shift or an index corresponding to the cyclic shift) by using the higher layer signaling. Alternatively, the access network side device sends, to the terminal side device by using the higher layer signaling, the related parameter used to determine the cyclic shift. Then, the terminal side device determines the cyclic shift. The higher layer signaling may be implemented by adding a quantity of bits to existing signaling used to indicate a cyclic shift in the LTE system or the NR system, or may be newly added RRC signaling specific to the terminal side device.

In a first possible implementation, the access network side device may determine a cyclic shift $\alpha_k$ (k=0, 1, 2, . . . , or K−1) of the CDM sequence used on each of the K uplink channel resources, and then send the higher layer signaling to the terminal side device to directly indicate the cyclic shift. The access network side device first determines the parameter $I_{idx}$ (optionally, the parameter $I_{idx}$ is referred to as an initial cyclic shift in some documents), determines the parameter $I_k$ based on the parameter $I_{idx}$ (optionally, the parameter $I_k$ is referred to as an offset of the cyclic shift $\alpha_k$ in some documents), and then determines the cyclic shift $\alpha_k$ based on the parameter $I_k$, where k=0, 1, 2, . . . , or K−1.

Optionally, the access network side device may specifically determine the parameter $I_k$ in the following manner.

$I_k$ and $I_{idx}$ satisfy the following relationship:

$$I_{idx}=I_0 \cdot (N_{cs})^0+I_1 \cdot (N_{cs})^1+ \ldots +I_k \cdot (N_{cs})^k+ \ldots +I_{K-1} \cdot (N_{cs})^{K-1}.$$

An operator $(x)^y$ represents an operation to the y power of x, for example, $(N_{cs})^k$ is the $k^{th}$ power of $N_{cs}$.

In an example, it is assumed that $N_{cs}=N_{sc}^{RB}$, and when a value range of the initial cyclic shift $I_{idx}$ is $[0,(N_{sc}^{RB})^{K-1}]$, according to the foregoing relational expression between $I_k$ and $I_{idx}$, a value of $I_k$ may be calculated by using the following formula:

$$I_k = \left\lfloor \left( \frac{I_{idx}}{(N_{sc}^{RB})^k} \right) \right\rfloor \bmod N_{sc}^{RB}$$

or $$I_k = \left\lfloor \left( \frac{I_{idx}}{(N_{sc}^{RB})^k} \right) \right\rfloor,$$

where mod represents a modulo operation, and $\lfloor \ \rfloor$ represents a rounding down operation.

In another example, it is assumed that $N_{cs}=N_{sc}^{RB}$, and when a value range of the initial cyclic shift $I_{idx}$ is $[0,(N_{sc}^{RB})^{K_{max}}-1]$ or is configured as any value by the access network side device by using higher layer signaling (for example, RRC signaling), a value of $I_k$ may be calculated by using the following formula:

$$I_k = \left\lfloor \left( \frac{I_{idx} \bmod (N_{sc}^{RB})^K}{(N_{sc}^{RB})^k} \right) \right\rfloor \bmod N_{sc}^{RB}$$

-continued or $$I_k = \left(\left\lfloor \frac{I_{idx} \bmod (N_{sc}^{RB})^K}{(N_{sc}^{RB})^k} \right\rfloor\right).$$

Further, after $I_k$ is calculated, a value of the cyclic shift on a $k^{th}$ (k=0, 1, 2, . . . , or K−1) uplink channel resource may be determined based on $I_k$ and by using the following formula:

$$\alpha_k = \frac{2\pi}{N_{sc}^{RB}}\left((I_k + m_{cs} + n_{cs}(n_{s,f}^\mu, l_k + l_k')) \bmod N_{sc}^{RB}\right) =$$

$$\frac{2\pi}{N_{sc}^{RB}}\left((I_k + m_{cs} + n_{cs}(n_{s,f}^\mu, l_0 + kL + l_0' + kL)) \bmod N_{sc}^{RB}\right)$$

$l_k$ is a sequence number of a start time domain symbol (from 0 to L−1, where L is a quantity of time domain symbols occupied by each uplink channel resource) of the $k^{th}$ uplink channel resource in time domain symbols occupied by the K uplink channel resources. $l_k'$ is a sequence number of the start time domain symbol of the $k^{th}$ uplink channel resource in a transmission time unit. Assuming that at least one time domain symbol occupied by each uplink resource request in the transmission time unit is sequentially arranged, the sequence number of the start time domain symbol of the $k^{th}$ uplink channel resource is $l_k = l_0 + kL$, where $l_0 = 0$. The sequence number of the start time domain symbol of the $k^{th}$ uplink channel resource in the transmission time unit is $l_k' = l_0' + kL$.

A value of $m_{cs}$ may be 0, and it indicates that the SR of the terminal device is not sent together with hybrid automatic repeat request (HARQ) information (is neither sent together with the HARQ-ACK information nor sent together with the HARQ-NACK information). $n_{s,f}^\mu$ represents a slot sequence number (which may also be referred to as a slot index) in a radio frame, µ may be a parameter that is defined in the NR system and that is used to determine the subcarrier spacing, $n_{cs}$ is a pseudo-random number, and for determining of $n_{cs}$, refer to a determining method in the NR system. For example, $n_{cs}(n_{s,f}^\mu, l)$ may be determined by using the following formula:

$$n_{cs}(n_{s,f}^\mu, l) = \sum_{m=0}^{7} 2^m c(14 \cdot 8 n_{s,f}^\mu + 8l + m),$$

where an initialized value $c^{init}$ in the formula may be determined based on a cell identifier, or may be notified by the access network side device to the terminal side device by using signaling.

In a second possible implementation, the access network side device may alternatively determine the related parameter $I_{idx}$ used to determine the cyclic shift $\alpha_k$ (k=0, 1, 2, . . . , or K−1) of the CDM sequence used on each of the K uplink channel resources, then send the higher layer signaling to the terminal side device to directly indicate the parameter $I_{idx}$. The terminal side device determines the related parameter $I_k$ of the cyclic shift $\alpha_k$ on the $k^{th}$ uplink channel resource based on the parameter $I_{idx}$, and then determines the cyclic shift $I_k$ based on the parameter.

The terminal side device determines the parameter $I_k$ of the cyclic shift $\alpha_k$ on the $k^{th}$ uplink channel resource by using the initial cyclic shift $I_{idx}$, and then determines the cyclic shift $\alpha_k$ based on the parameter $I_k$, in a manner that is the same as the manner in which the access network side device determines the parameter $I_k$ and the cyclic shift in the first possible implementation.

A quantity of bits of the higher layer signaling that indicates the parameter $I_{idx}$ is determined based on the maximum value $K_{max}$ of K. In the LTE system and the NR system, $K_{max}=12$ or $=14$. Optionally, the quantity of bits of the higher layer signaling is $\log_2 \lceil (N_{cs})^{K_{max}} \rceil$, and when $N_{cs}=N_{sc}^{RB}$, the quantity of bits is $\log_2 \lceil (N_{sc}^{RB})^{K_{max}} \rceil$, where $N_{sc}^{RB}$ is a quantity of subcarriers included in one RB, and $(N_{sc}^{RB})^{K_{max}}$ is usually 12. indicates the $K_{max}$ power of $N_{sc}^{RB}$.

For example, a resource of an uplink control channel is in the physical uplink control channel (PUCCH) format 0 or a PUCCH format 1. The initial cyclic shift $I_{idx}$ may be indicated by the access network side device by using a PUCCH-F0-F1-initial-cyclic-shift information element of RRC signaling.

In a third possible implementation, the access network side device first calculates the parameter $I_k$ based on the parameter $I_{idx}$, and then sends the higher layer signaling to the terminal side device to indicate the parameter $I_k$ of the cyclic shift $\alpha_k$, where the terminal side device determines the cyclic shift $\alpha_k$ based on the parameter $I_k$ in the first possible implementation. For a specific calculation manner, refer to the foregoing description.

A third embodiment of this application provides a cyclic shift determining method. The method provided in the third embodiment is a further refinement and extension of how to determine, based on the identifier of the terminal side device, the cyclic shifts of the CDM sequence used on the K uplink channel resources in the first embodiment. The identifier of the terminal side device may be a cell radio network temporary identifier (C-RNTI), a temporary cell radio network temporary identifier, or the like.

The identifier of the terminal side device is represented by $N_{ID}^{UE}$, and a relationship between an offset $I_k$ of a cyclic shift $\alpha_k$ on a $k^{th}$ uplink channel resource and $N_{ID}^{UE}$ is:

$$N_{ID}^{UE} = I_0 \cdot (N_{cs})^0 + I_1 \cdot (N_{cs})^1 + \ldots + I_k \cdot (N_{cs})^k + \ldots + I_{K-1} \cdot (N_{cs})^{K-1}.$$

The calculation formula of the above formula $I_k$ may be expressed as follows (where it is assumed that $N_{cs}=N_{sc}^{RB}$):

$$I_k = \left(\left\lfloor \frac{N_{ID}^{UE} \bmod (N_{sc}^{RB})^K}{(N_{sc}^{RB})^k} \right\rfloor\right) \bmod N_{sc}^{RB}$$

or $$I_k = \left(\left\lfloor \frac{N_{ID}^{UE} \bmod (N_{sc}^{RB})^K}{(N_{sc}^{RB})^k} \right\rfloor\right).$$

Further, after $I_k$ is calculated, a value of a cyclic shift $\alpha_k$ on a $k^{th}$ (k=0, 1, 2, . . . , or K−1) uplink channel resource may be determined based on $I_k$ and by using the following formula:

$$\alpha_k = \frac{2\pi}{N_{sc}^{RB}}\left((m_0^k + m_{cs} + n_{cs}(n_{s,f}^\mu, l_k + l_k')) \bmod N_{sc}^{RB}\right) =$$

$$\frac{2\pi}{N_{sc}^{RB}}\left((m_0^k + m_{cs} + n_{cs}(n_{s,f}^\mu, l_0 + kL + l_0' + kL)) \bmod N_{sc}^{RB}\right)$$

$l_k$ is a sequence number of a start time domain symbol (from 0 to L−1, where L is a quantity of time domain symbols occupied by each uplink channel resource) of the $k^{th}$ uplink channel resource in time domain symbols occupied by the K uplink channel resources. $l_k'$ is a sequence number of the start time domain symbol of the $k^{th}$ uplink channel resource in a transmission time unit. Assuming that at least one time domain symbol occupied by each uplink resource request in the transmission time unit is sequentially arranged, and the sequence number, of the start time domain symbol of the $k^{th}$ uplink channel resource is $l_k = l_0 + kL$, where $l_0 = 0$. The sequence number of the start time domain symbol of the $k^{th}$ uplink channel resource in the transmission time unit is $l_k' = l_0' + kL$.

When a quantity of connections that are to terminals and that need to be supported is far less than a maximum quantity $(N_{sc}^{RB})^K$ of terminals that can be supported by the access network side device, and a difference between identifiers of different terminal side devices is less than a threshold, the access network side device may multiply an identifier $N_{ID}^{UE}$ of each terminal side device by a positive integer $N_{scale}$, to increase the difference between the identifiers of the different terminal side devices. In this way, the calculated cyclic shift $\alpha_k$ is more random. The access network side device may indicate $N_{scale}$ to the terminal side device by using higher layer signaling (for example, RRC signaling), where the higher layer signaling is specific to a cell in which the terminal side device is located, or may be specific to the terminal side device.

Specifically, multiplying $N_{ID}^{UE}$ by the positive integer $N_{scale}$ may be represented as $\tilde{N}_{ID}^{UE} = (N_{ID}^{UE} \cdot N_{scale}) \bmod (N_{sc}^{RB})^K$, and a relationship between $I_k$ and $\tilde{N}_{ID}^{UE}$ is as follows:

$$\tilde{N}_{ID}^{UE} = I_0 \cdot (N_{sc}^{RB})^0 + I_1 \cdot (N_{sc}^{RB})^1 + \ldots + I_k \cdot (N_{sc}^{RB})^k + \ldots + I_{K-1} \cdot (N_{sc}^{RB})^{K-1}$$

The calculation formula of the above formula $I_k$ may be expressed as follows:

$$I_k = \left(\left\lfloor \frac{\tilde{N}_{ID}^{UE} \bmod (N_{sc}^{RB})^K}{(N_{sc}^{RB})^k} \right\rfloor\right) \bmod N_{sc}^{RB} \text{ or } I_k = \left(\left\lfloor \frac{\tilde{N}_{ID}^{UE} \bmod (N_{sc}^{RB})^K}{(N_{sc}^{RB})^k} \right\rfloor\right).$$

Further, after $I_k$ is calculated, the cyclic shift $\alpha_k$ on the $k^{th}$ (k=0, 1, 2, . . . , or K−1) uplink channel resource may be determined based on $I_k$. This is the same as the foregoing description, and details are not described herein again.

A fourth embodiment of this application provides a cyclic shift determining method. The method provided in the fourth embodiment is a further refinement and extension of how to determine, based on the identifier of the terminal side device, the cyclic shifts of the CDM sequence used on the K uplink channel resources in the first embodiment. The identifier of the terminal side device may be a cell radio network temporary identifier (C-RNTI), a temporary cell radio network temporary identifier, or the like.

An initialized value of a pseudo-random sequence (for example, a Gold sequence) is determined based on the identifier of the terminal side device, and then an offset $I_k$ of a cyclic shift $\alpha_k$ on a $k^{th}$ uplink channel resource is generated by using the pseudo-random sequence.

Optionally, a same initialized value is used for offsets ($I_0$, $I_1$, . . . , $I_{K-1}$), of K cyclic shifts on the K uplink channel resources. The initialized value may be $c_{init} = N_{ID}^{UE}$, and a value of $I_k$ may be determined by using the following formula:

$$I_k = \sum_{m=0}^{7} 2^m c(8k + m)$$

Optionally, different initialized values are used for offsets ($I_0$, $I_1$, . . . , $I_{K-1}$) of K cyclic shifts on the K uplink channel resources. An initialized value used for the cyclic shift $\alpha_k$ on the $k^{th}$ uplink channel resource is:

$$c_{init}^k = \left(\left\lfloor \frac{N_{ID}^{UE} \bmod (N_{sc}^{RB})^K}{(N_{sc}^{RB})^k} \right\rfloor\right) \bmod N_{sc}^{RB}$$

or $$c_{init}^k = \left(\left\lfloor \frac{\tilde{N}_{ID}^{UE}}{(N_{sc}^{RB})^k} \right\rfloor\right) \bmod N_{sc}^{RB}, \tilde{N}_{ID}^{UE} = (N_{ID}^{UE} \cdot N_{scale}) \bmod (N_{sc}^{RB})^K$$

Further, a value of $I_k$ may be determined by using the following formula:

$$I_k = \sum_{m=0}^{7} 2^m c(m).$$

Further, after $I_k$ is calculated, the cyclic shift $\alpha_k$ on the $k^{th}$ (k=0, 1, 2, . . . , or K−1) uplink channel resource may be determined based on $I_k$. This is the same as the foregoing description, and details are not described herein again.

A fifth embodiment of this application provides a cyclic shift determining method. The method provided in the fifth embodiment is a further refinement and extension of how to determine, based on the identifier of the terminal side device, the cyclic shifts of the CDM sequence used on the K uplink channel resources in the first embodiment. The identifier of the terminal side device may be a cell radio network temporary identifier (C-RNTI), a temporary cell radio network temporary identifier, or the like.

A same initialized value is used for offsets ($I_0$, $I_1$, . . . , $I_{K-1}$) of K cyclic shifts on the K uplink channel resources, and an offset $I_k$ of a cyclic shift $\alpha_k$ on a $k^{th}$ uplink channel resource is obtained based on the identifier of the terminal side device and according to the following formula:

$$I_k = \sum_{m=0}^{7} 2^m c(14 \cdot 8 \cdot N_{slot}^{frame} + 8 \cdot N_{ID}^{UE} \cdot K + 8 \cdot k + m)$$

or $$I_k = \sum_{m=0}^{7} 2^m c(14 \cdot 8 \cdot N_{slot}^{frame,u} + 8 \cdot \tilde{N}_{ID}^{UE} \cdot K + 8 \cdot k + m)$$

$$\tilde{N}_{ID}^{UE} = (N_{ID}^{UE} \cdot N_{scale}) \bmod (N_{sc}^{RB})^K$$

Further, after $I_k$ is calculated, the cyclic shift $\alpha_k$ on the $k^{th}$ (k=0, 1, 2, . . . , or K−1) uplink channel resource may be determined based on $I_k$. This is the same as the foregoing description, and details are not described herein again.

Figure 4:
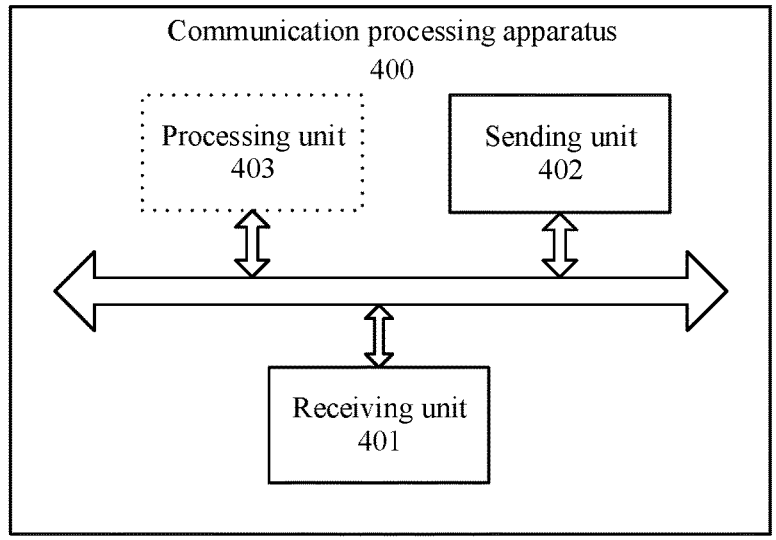
FIG. 4 is a schematic structural diagram of a communication processing device according to an embodiment of this application.

A sixth embodiment of this application provides a communication processing apparatus 400. FIG. 4 is a schematic structural diagram of units of the communication processing device, where the communication processing device 400 includes a receiving unit 401 and a sending unit 402.

Optionally, the communication processing apparatus 400 provided in the fourth embodiment of this application may be the terminal side device in the first embodiment to the fifth embodiment, and perform the method performed by the terminal side device. The receiving unit 401 is configured to perform a receiving action of the terminal side device, and the sending unit 402 is configured to perform a sending action of the terminal side device.

Optionally, the communication processing apparatus 400 provided in the fourth embodiment of this application may be the access network side device in the first embodiment to the fifth embodiment, and perform the method performed by the access network side device. The receiving unit 401 is configured to perform a receiving action of the access network side device, the sending unit 402 is configured to perform a sending action of the access network side device. Correspondingly, the communication processing apparatus 400 further includes a processing unit 403, configured to perform processing actions such as identification and determining performed by the access network side device.

Figure 5:
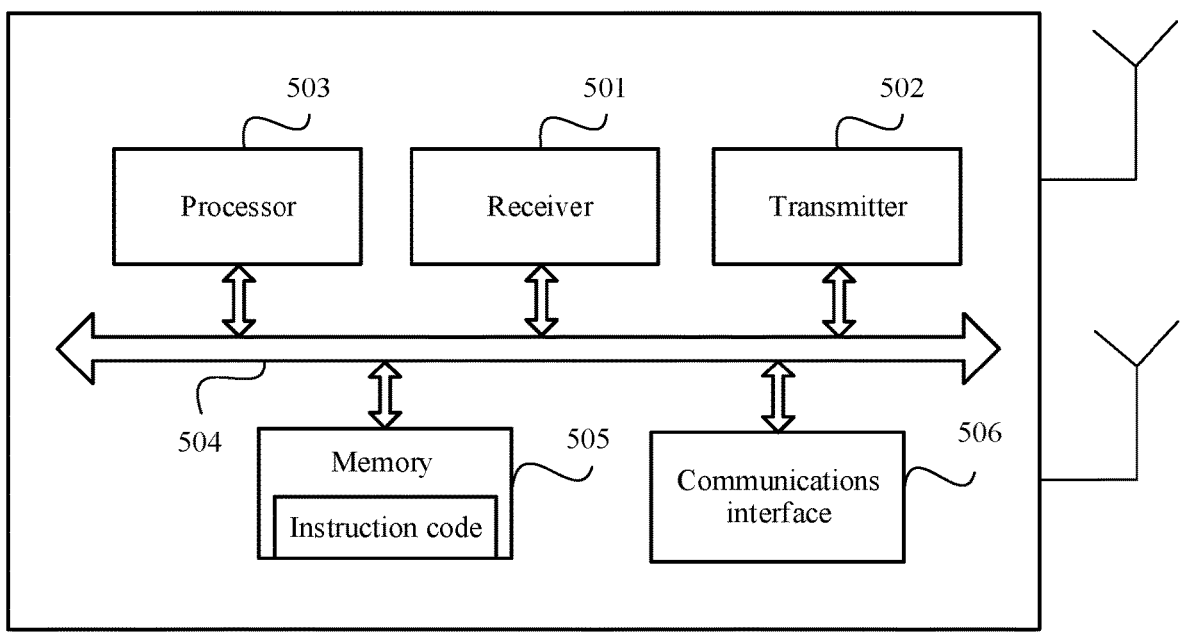
FIG. 5 is another schematic structural diagram of a communication processing device according to an embodiment of this application.

In a specific hardware implementation, FIG. 5 is a schematic diagram of a hardware structure of the communication processing apparatus shown in, a function of the receiving unit 401 may be specifically implemented by a receiver 501, a function of the sending unit 402 may be implemented by a transmitter 502, and a function of the processing unit 403 may be specifically implemented by a processor 503. The communication processing apparatus may further include various electronic lines, for example, a bus 504, a memory 505, and a communications interface 506. The memory may include instruction code. When the instruction code is invoked by the processor 503, the instruction code is used to implement functions of the access network side device or the terminal side device in the first embodiment, the second embodiment, or the third embodiment.

The communications interface may be a wired communications interface, a wireless communications interface, or a combination thereof. The wired communications interface may be, for example, an ethernet interface. The ethernet interface may be an optical interface, an electrical interface, or a combination thereof. The wireless communications interface may be a wireless local area network interface.

The bus may be a peripheral component interconnect (PCI) bus, an extended industry standard architecture (EISA) bus, or the like. The bus may be classified into an address bus, a data bus, a control bus, and the like.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the apparatus (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may be stored in a computer-readable memory that can instruct the computer or the another data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

What is claimed is:

1. A method for an uplink resource request, the method comprising:

sending, by a terminal side device, K uplink resource requests on K uplink channel resources, respectively, wherein the K uplink resource requests do not overlap in time domain, and K is an integer greater than or equal to 2; and receiving, by the terminal side device, resource allocation information from an access network side device, wherein the resource allocation information indicates an uplink resource, wherein cyclic shifts of a code division multiplexing (CDM) sequence are used to send the K uplink resource requests on the K uplink channel resources, respectively;

wherein a $k^{th}$ cyclic shift of the CDM sequence is a cyclic shift $\alpha_k$ used for a $k^{th}$ uplink resource request in the K uplink resource requests, wherein $\alpha_k$ is determined based on a parameter $I_k$ and $I_k$ satisfies the following relationship:

$$I_{idx}=I_0\cdot(N_{cs})^0+I_1\cdot(N_{cs})^1+\ldots+I_k\cdot(N_{cs})^m+\ldots+I_{K-1}\cdot(N_{cs})^{K-1}; \text{ and}$$

wherein $N_{cs}$ is a maximum quantity of possible values of the cyclic shift of the CDM sequence, the parameter $I_{idx}$ is the parameter indicated in the higher layer signaling, and k is any integer from 0 to K−1.

2. The method according to claim 1, further comprising:
receiving, by the terminal side device, higher layer signaling from the access network side device, wherein the higher layer signaling indicates the cyclic shifts of the CDM sequence used for sending the K uplink resource requests.

3. The method according to claim 1, further comprising:
receiving, by the terminal side device, higher layer signaling from the access network side device, wherein the higher layer signaling indicates a parameter that is used to determine the cyclic shifts, wherein the parameter corresponds to the terminal side device.

4. The method according to claim 3, wherein a quantity of bits occupied by the higher layer signaling is $\log_2\lceil(N_{cs})^{K_{max}}\rceil$, wherein $K_{max}$ is a maximum value of K, and $N_{cs}$ is the maximum quantity of possible values of the cyclic shift of the CDM sequence.

5. The method according to claim 1, wherein the cyclic shifts of the CDM sequence are determined based on an identifier of the terminal side device.

6. A terminal side device, comprising:
   at least one processor; and
   at least one memory storing instructions, wherein the instructions being executed by the at least one processor cause the terminal side device to:
   send K uplink resource requests on K uplink channel resources, respectively, wherein the K uplink resource requests do not overlap in time domain, and K is an integer greater than or equal to 2; and
   receive resource allocation information from an access network side device, wherein the resource allocation information indicates an uplink resource,
   wherein cyclic shifts of a code division multiplexing (CDM) sequence are used to send the K uplink resource requests on the K uplink channel resources, respectively;
   wherein a $k^{th}$ cyclic shift of the CDM sequence is a cyclic shift $\alpha_k$ used for a $k^{th}$ uplink resource request in the K uplink resource requests, wherein $\alpha_k$ is determined based on a parameter $I_k$ and $I_k$ satisfies the following relationship:

$$I_{idx} = I_0 \cdot (N_{cs})^0 + I_1 \cdot (N_{cs})^1 + \ldots + I_k \cdot (N_{cs})^m + \ldots + I_{K-1} \cdot (N_{cs})^{K-1}; \text{ and}$$

wherein $N_{cs}$ is a maximum quantity of possible values of the cyclic shift of the CDM sequence, the parameter $I_{idx}$ is the parameter indicated in the higher layer signaling, and k is any integer from 0 to K−1.

7. The terminal side device according to claim 6, wherein the instructions being executed by the at least one processor further cause the terminal side device to:
   receive higher layer signaling from the access network side device, wherein the higher layer signaling indicates the cyclic shifts of the CDM sequence used for sending the K uplink resource requests.

8. The terminal side device according to claim 6, wherein the instructions being executed by the at least one processor further cause the terminal side device to:
   receive higher layer signaling from the access network side device, wherein the higher layer signaling indicates a parameter that is used to determine the cyclic shifts, wherein the parameter corresponds to the terminal side device.

9. The terminal side device according to claim 8, wherein a quantity of bits occupied by the higher layer signaling is $\log_2 \lceil (N_{cs})^{K_{max}} \rceil$, wherein $K_{max}$ is a maximum value of K, and $N_{cs}$ is the maximum quantity of possible values of the cyclic shift of the CDM sequence.

10. The terminal side device according to claim 6, wherein the cyclic shifts of the CDM sequence are determined based on an identifier of the terminal side device.

11. An access network side device, comprising:
    at least one processor; and
    at least one memory storing instructions, wherein the instructions being executed by the at least one processor cause the terminal side device to:
    receive K uplink resource requests on K uplink channel resources, respectively, wherein K is an integer value greater than or equal to 2;
    identify a terminal side device that sends the K uplink resource requests based on at least one of (i) the integer value of K, (ii) cyclic shifts of a code division multiplexing (CDM) sequence for the K uplink resource requests, or (iii) a combination of the cyclic shifts of the CDM sequence for the K uplink resource requests and the integer value of K; and
    send resource allocation information to the terminal side device, wherein the resource allocation information indicates an uplink resource;
    wherein a $k^{th}$ cyclic shift of the CDM sequence is a cyclic shift $\alpha_k$ used for a $k^{th}$ uplink resource request in the K uplink resource requests, wherein $\alpha_k$ is determined based on a parameter $I_k$ and $I_k$ satisfies the following relationship:

$$I_{idx} = I_0 \cdot (N_{cs})^0 + I_1 \cdot (N_{cs})^1 + \ldots + I_k \cdot (N_{cs})^m + \ldots + I_{K-1} \cdot (N_{cs})^{K-1}; \text{ and}$$

wherein $N_{cs}$ is a maximum quantity of possible values of the cyclic shift of the CDM sequence, the parameter $I_{idx}$ is the parameter indicated in the higher layer signaling, and k is any integer from 0 to K−1.

12. The access network side device according to claim 11, wherein the instructions being executed by the at least one processor further cause the access network side device to:
    send higher layer signaling to the terminal side device, wherein the higher layer signaling indicates the cyclic shifts of the CDM sequence for the K uplink resource requests.

13. The access network side device according to claim 11, wherein the instructions being executed by the at least one processor further cause the access network side device to:
    send higher layer signaling to the terminal side device, wherein the higher layer signaling indicates a parameter that is used to determine the cyclic shifts of the CDM sequence for the K uplink resource requests, wherein the parameter corresponds to the terminal side device.

14. The access network side device according to claim 13, wherein a quantity of bits occupied by the higher layer signaling is $\log_2 \lceil (N_{cs})^{K_{max}} \rceil$, wherein $K_{max}$ is a maximum value of K, and $N_{cs}$ is the maximum quantity of possible values of the cyclic shift of the CDM sequence.

15. The access network side device according to claim 11, wherein the cyclic shifts of the CDM sequence are determined based on an identifier of the terminal side device.

* * * * *